Figure 1:
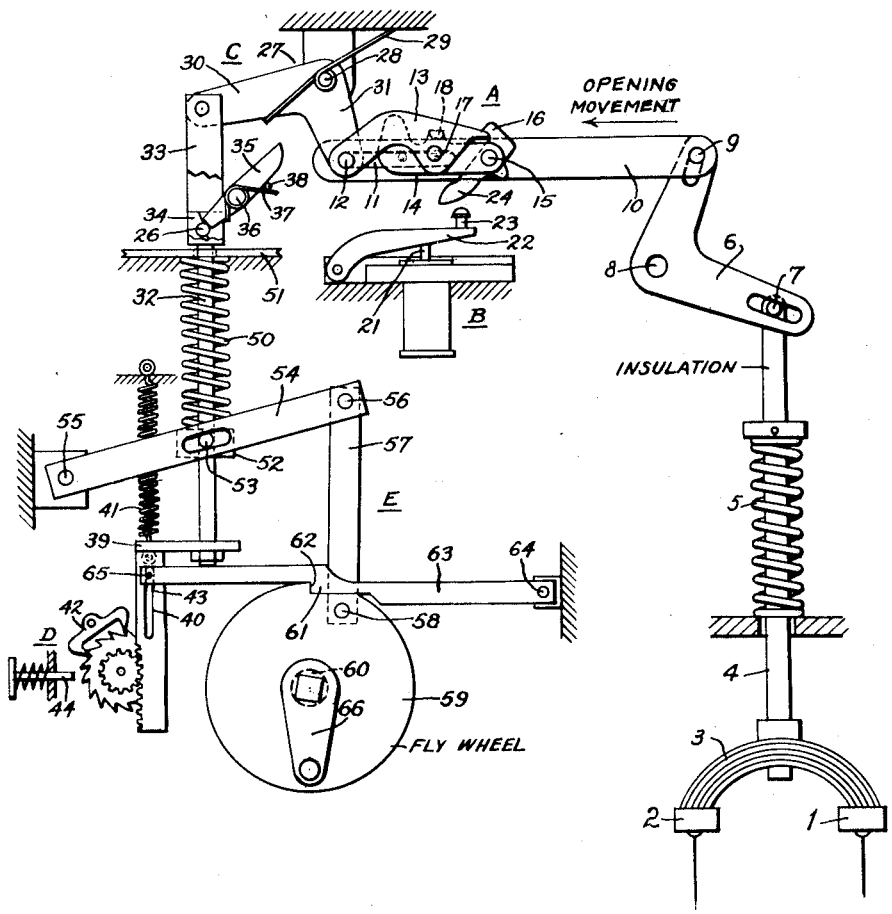

Oct. 2, 1951    R. A. PHILLIPS    2,570,153
RECLOSING MECHANISM FOR CIRCUIT BREAKERS
Filed March 17, 1948    2 Sheets-Sheet 2
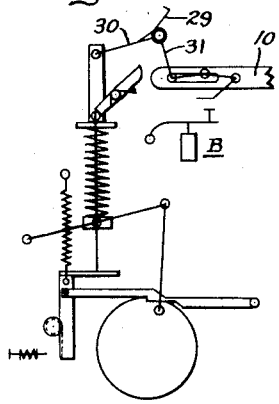
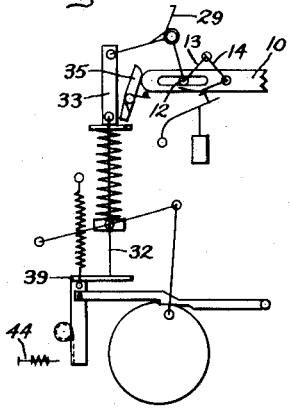
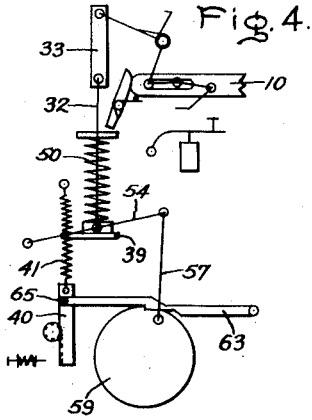
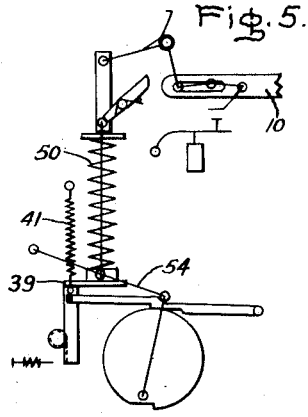
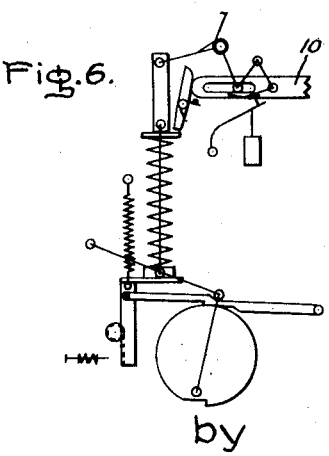
Inventor:
Roy A. Phillips,
by Ernest F. Britton
His Attorney.

Patented Oct. 2, 1951

2,570,153

UNITED STATES PATENT OFFICE 2,570,153

RECLOSING MECHANISM FOR CIRCUIT BREAKERS

Roy A. Phillips, Peterborough, Ontario, Canada, assignor to General Electric Company, a corporation of New York Application March 17, 1948, Serial No. 15,395
In Canada December 4, 1946

10 Claims. (Cl. 200—89)

My invention relates to operating mechanisms for circuit breakers and more particularly to automatic reclosing mechanisms.

In electric distribution systems, it is customary to provide circuit breakers arranged to be automatically tripped open in response to an indication of a fault in the system so that the flow of current to the fault is interrupted. However, a large percentage of the faults occurring in the system are of a temporary nature and from the standpoint of continuity of service, it is desirable that the circuit breaker be automatically reclosed.

The object of my invention is to provide a circuit breaker operating mechanism which is rugged in construction, simple in construction, economical in manufacture, and reliable in operation, which will promptly open the circuit breaker on the occurrence of a fault and which will automatically reclose the circuit breaker in a short time and in a condition to be released again if the faulty condition of the line still exists.

Further objects and advantages of my invention will become apparent from a consideration of the following detailed description of a specific embodiment thereof in which Fig. 1 is a view of a mechanism of my invention with the supporting housing not shown so that the operation of the parts may be more readily understood. Fig. 2 is a simplified schematic showing of the operating mechanism with the parts in the same position as shown in Fig. 1; Figs. 3, 4, 5 and 6 are diagrams similar to Fig. 2 illustrating the position of the parts in various other positions of operation.

For a more detailed description of the mechanism of my invention reference is directed to the drawing. Fig. 1 shows the mechanism in normal circuit breaker closed position, and Fig. 2 is a simplified diagram illustrating the same position of the elements as Fig. 1 for purposes of comparison with other positions. Fixed contacts 1 and 2 cooperate with bridging contact 3 supported on rod 4. Spring 5 biases the contact 3 toward the open position. Rod 4 is connected at its upper end to crank 6 by pin 7. Crank 6 is pivotally mounted at pin 8 and is connected to the link 10 by a pin 9. The operating link for the circuit breaker has been indicated by reference character 10 and as has been indicated in Fig. 1, this link moves to the left on the opening of the breaker. The left-hand end of the link 10 is provided with an elongated opening 11 whereby the link may move rectilinearly on the pin 12, the limits of travel being defined by the ends of the opening. The latching means or toggle illustrated is of a known type and comprises a link 13 which is pivotally connected to the pin 12, a second link 14 which is pivotally connected to the link 10 at 15, and a latch 16 which is also pivotally mounted at 15. The links 13 and 14 are pivotally connected together at 17. The extreme extended position of the toggle is determined by the detent 18 and in this position the pivot 17 is above the line of center of the pivots 12 and 15. In this position the toggle is held against collapse by pressure applied against the right-hand end of the link 10 by the latch 16, engaging over the tail of the link 13 as shown.

The tripping mechanism B is of a well known type having an electromagnetically actuated plunger 21 which may have an adjustable head. The mechanism B is mounted in the framework in such a position that the projection upwardly of the plunger 21 moves an arm 22 about its pivot causing the adjustable striker 23 thereon to strike the tail 24 of the latch 16 pivoting it about the pin 15 and releasing the end of the toggle member 13.

The stored energy or toggle resetting mechanism generally indicated by C consists of a bell crank 27 mounted for rotary movement on a pivot 28 carried by the fixed framework of the apparatus. The bell crank 27 is biased for rotation in a clockwise direction by a torsion spring 29 one end of which engages under the arm 30 thereof and the other end of which engages the fixed framework as shown. The other arm 31 of the bell crank carries at its end the pivot 12 to which the toggle arm 13 is pivoted and on which the link 10 slides. Pivotally depending from the end of the crank arm 30 is a connecting rod 32. A link 33 constituting the upper portion of the rod 32 is connected thereto by a cross head 34 and pin 26. The cross head is suitably guided for movement in a vertical direction, the ends of the pin 26 preferably riding in slots provided in the framework. In the position shown in Fig. 1 the rod 32 is free to move upwardly under the influence of the spring 29 (if the circuit breaker is open), except that it is blocked by a prop 35 mounted on a pivot 36 in the framework and biased into a blocking position against the crosshead by a torsion spring 37. Crosshead 34 is restricted to vertical motion because pin 26 engages in vertical slots in the side frames of the mechanism. A limiting stop 38 is provided for the prop 35. The prop is mounted in the framework in such a position that its upper end lies in the line of movement of the link 10 in a position to be engaged thereby in the final part of the opening movement. The rod 32 carries at its lower end a plate 39.

The timing element D consists of a link 40 mounted to permit vertical movement thereof. In the position shown in Fig. 1 the link 40 is restrained from upward movement under the influence of the tension spring 41 by engagement of its upper end under the plate 39 on the connecting rod 32. When the plate 39 is removed from the blocking position shown by reason of upward movement of rod 32, upward movement of the link 40 is retarded by a toothed wheel and escapement mechanism generally shown at 42. The particular form of escapement mechanism is well known in the art and forms no part of my present invention. It is sufficient to state that when the link 40 is pushed downwardly, against the tension of the spring 41, it becomes engaged by a mechanism under the control of an escapement and that for a limited range of movement upwardly under the influence of the spring 41 the escapement 42 retards its motion. At the end of a predetermined upward motion, the link 40 is released from the escapement mechanism and completes its stroke rapidly. A locking plunger 44 is mounted for longitudinal movement in the mechanism D and is normally spring pressed to a position where it is inoperative. From this position it may be manually operated when desired to block upward movement of the link 40.

The circuit breaker resetting mechanism generally indicated at E is powered by stored energy means such as compression spring 50 shown in Fig. 1 compressed between a fixed part of the framework indicated at 51 and a block support 52. The block 52 is pivotally mounted at 53 midway of the length of a beam 54 one end of which is pivoted at 55 to a fixed part of the framework. The other end of the beam 54 is pivoted at 56 to the upper end of a link 57, the lower end of which is pivoted at 58 to a fly wheel 59. It will be apparent that the spring 50 pressing down on the block 52 will tend to rotate the fly wheel 59 in a clockwise direction about its axis 60 through the intervening beam 54 and link 57 but that such rotation is prevented by a latch 61 which is engaged by a detent 62 on the periphery of the fly wheel. The latch 61 is located midway of the length of an interference bar 63 which is pivoted at one end to the fixed framework as indicated at 64. The end of the bar 63 remote from the pivot lies adjacent the upper end of the link 40 of the timer mechanism and carries a pin 65 located in the slot 43 thereof. The parts are so located and arranged with respect to one another that in the latched position of the fly wheel shown, the pin 65 lies near the upper end of the slot 43 and that the pin 65 is not moved upward till the link 40 has moved upward a sufficient distance for the lower end of the slot 43 to engage it. The fly wheel axle 60 is shown provided with a squared end 66 whereby a suitable handle may be applied.

The operation of the apparatus above described is as follows. As shown in Fig. 1 and diagrammatically in Fig. 2 the circuit breaker is in its normal closed position, with the link 10 in its extreme right position. When a fault occurs on a system with which the circuit breaker is connected, energy is supplied to the electromagnet of device B in any known manner in response to the fault condition. This projects the plunger 21 upwardly whereby it strikes the end 24 of the toggle latch which turns about its pivot 15 and releases its latch 16 from the end of the toggle link 13. The force exerted by the closed circuit breaker tending to move the link 10 to the left causes the toggle to collapse as its other end is blocked by the pivot 12. As the crank 27 is in blocked position, the pin 12 on its arm 27 remains stationary during the movement of the link 10 to the left, the pin 12 riding in the slot 11. Near the end of its opening movement, the left-hand end of the link 10 strikes the upper end of the prop 35 rotating it counterclockwise about its pivot 36 against the pressure of its spring 37. This removes the lower end of the prop 35 from its position blocking upward movement of the rod 32. The position of the parts at this point of the operation is illustrated in the diagram of Fig. 3. From this position the spring 29 rotates the crank 27 about its pivot 28 in a clockwise direction. The pin 12 on the arm 31 of the crank consequently moves to the left in the slot 11 and in this movement straightens out the links of the toggle which automatically latches in its set position. The clockwise movement of the crank 27 also causes arm 30 to pull upwardly on the link 33 and its connected rod 32. The position of the parts at this stage of the operation is illustrated in the diagram of Fig. 4. It will be observed that the condition of the toggle mechanism with relation to the link 10 is the same as in Fig. 1 except that the assembly is now at the extreme left of the range of movement of the link. It will also be observed that the upward movement of the rod 32 has carried the blocking plate 39 at its lower end from its position blocking the upward movement of the link 40 of the timer to a position directly beneath block 52.

The unblocking of the link 40 of the timer permits it to move gradually upward under the influence of the spring 41 at a rate controlled by the setting of the timer 42. At the conclusion of a predetermined time, the link 40 is threaded from the control of th timer and moves upward rapidly for the remainder of its stroke. The length of the slot 43 in the link 40 is selected so that the pin 65 on the trip latch is not struck by the plate 40 till the rapid upward movement occurs. This delivers a sharp blow at the end of the arm 63 knocking the latch 61 clear of its position blocking the fly wheel 59. As the fly wheel is thus unblocked, this permits the spring 50 to exert its force, in a manner controlled by the fly wheel 59, in a downward direction through the plate 39 on the rod 32. This downward movement through the crank 27 and the latched toggle mechanism forces the link 10 to the right and closes the circuit breaker to complete a reclosing operation. This position of the mechanism is illustrated in the diagram of Fig. 5. It will be observed that the parts are in the same position as shown in Fig. 2 except that the spring 50 and the fly wheel with its associated parts are in the discharged condition. It will be observed that the plate 39 on the end of the rod 32 has engaged the upper end of the timer plate 40 and depressed it against the tension of the spring 41. It will also be apparent that the prop 35 under the influence of its spring has returned automatically to its blocking position.

If in the time interval provided by the reclosing operation above described the fault on the system has been cleared, the circuit breaker remains closed and the spring 50 may be compressed to condition the apparatus for a further operation. The compression of the springs can be accomplished by an attendant by turning crank 66 in a counterclockwise direction. During this rotation compression force is exerted on the spring through the link 57 and the beam 54. During this operation the latch 61 rides on the periphery of the fly wheel till the fly wheel reaches the position where the latch 61 drops by gravity into the detent 62. This returns the apparatus to the condition shown in Figs. 1 and 2, that is in condition to perform a reclosing operation on a further fault occurring on the system.

If, however, the fault on the system has not cleared, the toggle mechanism is again immediately tripped and the circuit breaker promptly reopens in the manner already described. The link 10 moves to the left, the toggle collapses, and the prop 35 is moved to unblocking position. However, the toggle resetting force delivered by the spring 29 is insufficient to overcome the downward pressure on the rod 32 of the discharged main spring 50 and the toggle does not reset and no further reclosing operation takes place. The condition of the parts of the mechanism in this fully discharged condition with the circuit breaker open is illustrated in the diagram of Fig. 6.

When the faulty condition has been removed from the line the circuit breaker can be reclosed by an attendant and the mechanism recharged to its normal condition as shown in Fig. 1. In recharging from the fully discharged position of Fig. 6 it is necessary for the attendant to first compress the spring 50 thus allowing the toggle to reset as in Fig. 4 and then to allow it to discharge to close the circuit breaker. As the circuit breaker remains closed the attendant again compresses the spring 50. In the first of these two compressing operations it will be noted that as the spring 50 is compressed, the plate 39 of the rod 32 will under the influence of the spring 29 follow the block support 52 in an upward direction. This unblocks the link 40 of the timer bringing it into operation before the fly wheel 59 is rotated to latched positon. It is necessary therefore, in the first of these two compressing operations of the spring 50 to restrain the timer plate 40. To do this I have provided the rod 44 in the timer having a part extending to a position convenient for the attendant. The rod 44 normally takes no part in the operation of the timer, but during the compression of the spring 50 it may be pressed inwardly to a position where it engages the mechanism and restrains the link 40 from upward movement. When the fly wheel 59 has been rotated to its latched position shown in Fig. 4, the rod 44 is released, permitting the timer to unlach the fly wheel and the compression spring to close the breaker as has been previously described. After this operation, the parts are in the circuit breaker closed spring discharged position illustrated in Fig. 5. In this position, the plate 39 now holds the timer link 40 depressed. The spring is then compressed from this condition in the manner described to return the breaker to the fully charged position of Fig. 1.

The mechanism described delivers an effective closing stroke to the circuit breaker. The force exerted by the spring 50 is greatest at the start of its application and decreases as it expands. The application of this force to the operating rod is modified to accelerate the operating rod uniformly and at the end of the closing stroke to deliver a powerful closing force to force the breaker contacts closed against the opposing forces of the contacts and the magnetic repulsion forces encountered.

The effort required to operate a circuit breaker is generally greatest during the final portion of the closing stroke. To obtain the necessary distribution of output effort from the operating mechanism during the closing stroke the flywheel is introduced. During the early portion of the closing operation of the circuit breaker, in addition to providing effort for accelerating and moving against gravity the breaker contacts, the spring imparts energy to overcome the inertia of the fly wheel and to accelerate it. Toward the end of the closing stroke of the circuit breaker, the spring effort is assisted by the delivery of the energy stored in the fly wheel and a powerful closing force is provided to the breaker contacts. This effect is further modified to obtain the desired results by the toggle effect in the mechanism linkage between the fly wheel and the operating link 57. Thus with the parts in the position shown in Fig. 1, the pin 58 is close to an imaginary straight line between shaft 60 and pin 56. As the fly wheel rotates clockwise, the pin 58 moves farther to the right so that the effective lever arm between shaft 60 in a direction perpendicular to the line of action of the force exerted on pin 58 is increased. This gradual increase in the lever arm aids acceleration of the fly wheel while the spring 50 is applying a force which is gradually reduced in magnitude so that the effective torque applied to the fly wheel is not changed appreciably until the spring force becomes relatively small.

It will be apparent that I have provided a mechanism which is relatively simple in design and rugged in construction which can be manufactured relatively cheaply.

It will also be apparent that I have provided a mechanism which will operate reliably to promptly open a circuit breaker on the occurrence of a fault and then reclose it and thus take care of the very great proportion of the faults occurring in a system.

While I have illustrated and described in detail a single preferred embodiment of my invention, I desire it to be understood I am not limited to the specific details thereof and that changes and modifications will occur to one skilled in the art without departing from my invention as defined in the claims.

What I claim as new and desire to secure by Letters Patent of the United States is:

1. In an electric circuit breaker of the biased open type, a reclosing mechanism comprising a member operatively connected to said circuit breaker and movable from a normal position to an operated position, latching means arranged to restrain said member in its normal position to hold said breaker in the closed position, means for releasing said latching means to cause said breaker to open, means operably related with said holding means and operable in response to opening movement of said circuit breaker for resetting said latching means with respect to said member, closing means for imparting circuit closing movement to said member, an interference member normally disposed in the path of movement of said closing means and normally preventing operation thereof, and time delayed means for moving said interference member out of the path of movement of said closing means in response to opening of said circuit breaker, the delay of said time delayed means being longer than the time required for the resetting of said latching means.

2. In an electric circuit breaker of the biased open type, a reclosing mechanism comprising a member operatively connected to said circuit breaker, latching means arranged normally to restrain said member in a position corresponding to the closed position of said breaker, means for releasing said latching means to cause said breaker to open, stored energy means operable in response to opening movement of said circuit breaker for resetting said latching means with respect to said member, closing means for imparting circuit closing movement to said member, an interference member normally in engagement with said closing means for preventing the application of closing force to said member, and means responsive to operation of said stored energy means for rendering said interference member ineffective to prevent operation of said closing means.

3. An operating mechanism for an electric circuit breaker comprising means for imparting opening movement to said circuit breaker, a collapsible thrust transmitting structure operatively connected to said circuit breaker, latching means for holding said structure rigid thereby to maintain said circuit breaker in the closed position, means for releasing said latching means to collapse said structure thereby to cause said circuit breaker to open, means operable in response to opening movement of said circuit breaker for rendering said structure rigid, means for imparting closing movement to said circuit breaker by exerting a closing force on said structure after said structure is restored to its rigid condition in response to opening movement of said circuit breaker, and interference means normally engaging said last-mentioned means for preventing the application of closing force to said structure until after said latching means is completely reset.

4. An operating mechanism for an electric circuit breaker comprising means for imparting opening movement to said circuit breaker, a collapsible thrust transmitting structure operatively connected to said circuit breaker, a first latching means for holding said structure rigid thereby to maintain said circuit breaker in the closed position, means for releasing said latching means to collapse said structure thereby to cause said circuit breaker to open, resetting means operable in response to opening movement of said circuit breaker for rendering said structure rigid, means for imparting closing movement to said circuit breaker by exerting a closing force on said structure after said structure is restored to its rigid condition in response to opening movement of said circuit breaker, a second latching means normally restraining said means for imparting closing movement to said circuit breaker, and time delayed means actuated responsive to operation of said resetting means for releasing said second latching means after the resetting of said first latching means.

5. A circuit breaker reclosing mechanism comprising a member operably connected to a circuit breaker and having a normal position and an operated position, latching means normally restraining said member in its normal position for holding said breaker in one position, means for releasing said latching means to cause said breaker to move to another position, a first stored energy means releasable responsive to breaker movement toward said another position for resetting said latching means with respect to said member, a second stored energy means operatively connectable to said member for moving said breaker back toward said one position, and means for blocking the application of said second stored energy means to said member until after the release of said first stored energy means.

6. A circuit breaker reclosing mechanism comprising a member operably related with a circuit breaker and movable from a normal position to an operated position, a first latch means normally restraining said member in its normal position for holding said breaker in one position, means for releasing said first latch means to cause said breaker to move to another position, a first stored energy means releasable responsive to breaker movement from said one position for resetting said first latch with respect to said member, a second stored energy means operatively connectable to said member for moving said breaker back toward said one position, a second latch means normally restraining said second stored energy means, and means for preventing the release of said second latch prior to the resetting of said first latch.

7. A circuit breaker reclosing mechanism comprising a member operably related with a circuit breaker and movable from a normal position to an operated position, a first latch means normally restraining said member in its normal position for holding said breaker in one position, means for releasing said first latch means to cause said breaker to move to another position, a first stored energy means releasable responsive to breaker movement from said one position for resetting said first latch with respect to said member, a second stored energy means operatively connectable to said member for moving said breaker back toward said one position, a second latch means normally restraining said second stored energy means, and means for releasing said second latch in response to the operation of said first stored energy means.

8. A circuit breaker reclosing mechanism comprising a collapsible thrust-transmitting structure operatively connected to a circuit breaker, a first latch means maintaining said structure rigid for holding said breaker in one position, means for releasing said first latch means to cause said breaker to move to another position due to the collapse of said structure, a first stored energy means releasable responsive to breaker movement for resetting said first latch so as to restore rigidity to said structure, a second stored energy means operatively connectable to said structure for moving said breaker back toward said one position, a second latch means normally restraining said second stored energy means, and means for preventing the release of said second latch prior to the resetting of said first latch.

9. A circuit breaker reclosing mechanism comprising a collapsible thrust-transmitting structure operatively connected to a circuit breaker, a first latch means maintaining said structure rigid for holding said breaker in one position, means for releasing said first latch means to cause said breaker to move to another position due to the collapse of said structure, a first stored energy means releasable responsive to breaker movement for resetting said first latch so as to restore rigidity to said structure, a second stored energy means operatively connectable to said structure for moving said breaker back toward said one position, a second latch means normally restraining said second stored energy means, and means for releasing said second latch in response to the operation of said first stored energy means.

10. In an electric circuit breaker, an operating mechanism comprising means for imparting opening movement to said circuit breaker, a collapsible thrust transmitting structure operatively connected to said circuit breaker, a first latching means for holding said structure rigid thereby to maintain said circuit breaker in the closed position, means for releasing said latching means to collapse said structure thereby to cause said circuit breaker to open, means including a spring and operable in response to opening movement of said circuit breaker for rendering said structure rigid, means including a precharged spring for imparting closing movement to said circuit breaker by exerting a closing force on said structure after said structure is restored to its rigid condition in response to opening movement of said circuit breaker, an interference member normally engaging said means for imparting closing force to said circuit breaker for preventing the application of closing force to said structure, spring means for moving said interference member out of engagement with said means for imparting closing force to said structure, time delay means arranged to control the operation of said spring means for preventing the disengagement of said interference member from said means for imparting closing force to said structure until after said structure is restored to its rigid condition in response to opening movement of said circuit breaker.

ROY A. PHILLIPS.

REFERENCES CITED

The following references are of record in the file of this patent:

UNITED STATES PATENTS

| Number | Name | Date |
|---|---|---|
| 1,272,444 | Holliday | July 16, 1918 |
| 1,670,088 | Walle | May 15, 1928 |
| 2,053,961 | Linde | Sept. 8, 1936 |
| 2,318,342 | Thompson | May 4, 1943 |
| 2,461,846 | Schultz | Feb. 15, 1949 |